United States Patent
Kalach et al.

(10) Patent No.: US 10,581,966 B2
(45) Date of Patent: Mar. 3, 2020

(54) CLOUD SERVICES INTEGRATED BACKUP AND RESTORE

(71) Applicant: Microsoft Technology Licensing, LLC, Redmond, WA (US)

(72) Inventors: Ran Kalach, Bellevue, WA (US); Giridharan Kasirala Ramachandraiah, Bothell, WA (US); Sriram Sampath, Telangana (IN); Manoj Karunakaran Valiyaparambil, Telangana (IN); Abhinav Srivastava, Santa Clara, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 111 days.

(21) Appl. No.: 15/992,719

(22) Filed: May 30, 2018

(65) Prior Publication Data
US 2019/0373056 A1 Dec. 5, 2019

(51) Int. Cl.
*G06F 21/00* (2013.01)
*G06F 21/56* (2013.01)
*G06F 11/14* (2006.01)
*H04L 29/08* (2006.01)

(52) U.S. Cl.
CPC ...... *H04L 67/1095* (2013.01); *H04L 67/1097* (2013.01)

(58) Field of Classification Search
USPC ........................................ 709/224, 225, 229
See application file for complete search history.

(56) References Cited

U.S. PATENT DOCUMENTS

| | | | |
|---|---|---|---|
| 9,317,686 B1* | 4/2016 | Ye | G06F 11/1461 |
| 2017/0017553 A1* | 1/2017 | Peleg | G06F 11/1464 |
| 2017/0177867 A1* | 6/2017 | Crofton | G06F 21/566 |
| 2017/0180394 A1* | 6/2017 | Crofton | H04L 63/145 |

OTHER PUBLICATIONS

"Get Storage Account Keys", Retrieved from: https://msdn.microsoft.com/en-us/library/azure/ee460785.aspx, Retrieved on Jun. 26, 2017, 2 Pages.

"Providers", Retrieved from: https://msdn.microsoft.com/en-us/library/azure/dn790524.aspx, Feb. 1, 2018, 1 Page.

"Rest API Browser", Retrieved from: https://msdn.microsoft.com/en-us/library/azure/dn790557.aspx, Retrieved on Jun. 26, 2017, 1 Page.

(Continued)

*Primary Examiner* — Jude Jean Gilles
(74) *Attorney, Agent, or Firm* — Buckley, Maschoff & Talwalkar LLC (57) ABSTRACT

A system includes determination of a resource stored in a cloud storage service, identification of a first cloud service associated with the resource, determination of a first pre-backup callback and a first post-backup callback associated with the first cloud service, transmission of the first pre-backup callback to the first cloud service, reception of a return of the first pre-backup callback from the first cloud service, transmission, in response to receipt of the return, of an instruction to the cloud storage service to backup the resource, and transmission of the first post-backup callback to the first cloud service.

20 Claims, 9 Drawing Sheets

(56) References Cited

OTHER PUBLICATIONS

Cicoria, Shawn, "Azure Resource Manager Samples", Retrieved from: https://github.com/cicorias/AzureResourceManagerSamples, Retrieved on Jun. 26, 2017, 1 Page.

Fitzmacken, et al., "Azure Resource Manager", Retrieved from: https://msdn.microsoft.com/en-us/libraryiazure/dn790568.aspx, Nov. 16, 2016, 2 Pages.

Fitzmacken, et al., "Azure Resource Manager overview", Retrieved from: https://azure.microsoft.com/en-us/documentation/articles/resource-group-overview/, Jun. 25, 2018, 12 Pages.

Lyon, Robert, "Manage access using RBAC and the Azure portal", Retrieved from: https://azure.microsoft.com/en-us/documentation/articles/role-based-access-control-configure/, Jun. 13, 2018, 11 Pages.

Ormond, et al., "Microsoft cloud services and network security", Retrieved from: https://azure.microsoft.com/en-us/documentation/articles/best-practices-resource-manager-security/, Jan. 3, 2017, 30 Pages.

Panwar, et al., "Active Directory Authentication Library (ADAL) for .NET, Windows Store, .NET Core, Xamarin iOS and Xamarin Android", Retrieved from: https://github.com/AzureAD/azure-activedirectory-library-for-dotnet, Retrieved on Jun. 26, 2017, 3 Pages.

* cited by examiner

CLOUD SERVICES INTEGRATED BACKUP AND RESTORE

BACKGROUND

Generally, a cloud service is a resource that is delivered to customers by a service provider via the internet. A cloud service may in turn consume resources provided by another cloud service, such as data files or other resources stored by a cloud storage provider. It is desirable to create scheduled and/or manual backups of these resources. The created backups are preferably consistent from the perspective of the consuming cloud service. Consistent backups facilitate restoration of the cloud service to a known good state.

Conventional backup systems can create backups of cloud-based resources using snapshots. However, these systems do not effectively integrate with cloud services consuming those cloud resources. For example, conventional systems fail to provide an efficient mechanism for integrating operation of a cloud service with a backup or restore process. Consequently, it may be difficult to ensure that the resource is brought to a consistent state before creating a backup, that service activity on the resource is paused during a restore, and/or that the service performs needed post-processing after the restore completes.

DETAILED DESCRIPTION

The following description is provided to enable any person in the art to make and use the described embodiments. Various modifications, however, will remain readily-apparent to those in the art.

Some embodiments address the foregoing by integrating a cloud backup solution with cloud services through the transmission of callbacks before and after backup and restore. Such integration may facilitate the creation of cloud resource backups that are consistent with the cloud services consuming them, and the restoration of cloud resources to a consistent state from cloud backups.

According to some embodiments, during backup of a cloud resource such as a shared file, a backup service executes a discovery process to identify one or more cloud services that are consuming the file. This identification includes determination of calls which should be made into each identified cloud service before and after the file is backed-up. The backup service then makes the "pre-backup" call, in response to which the service performs any actions required to place the file in a consistent state and returns a status or other acknowledgement. The backup service then generates a backup of the resource. Next, the backup service calls the "post-backup" call to instruct the cloud service to perform any needed post-processing. Some embodiments thereby ensure that the backup of the resource is consistent with the cloud services which consume the resource.

Figure 1:
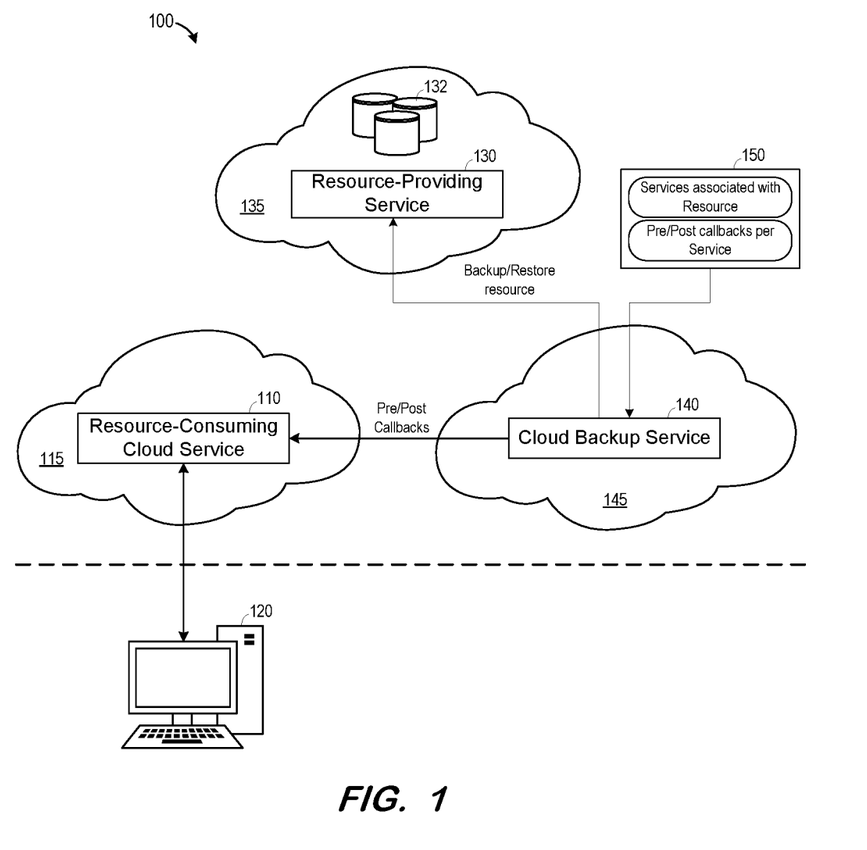
FIG. 1 illustrates an integrated cloud service backup architecture according to some embodiments.

FIG. 1 illustrates architecture 100 according to some embodiments. Architecture 100 includes cloud service 110 which provides services to client system 120. Cloud service 110 consumes resources provided by resource-providing service 130 in order to provide services to client 120. The consumed resources may comprise any cloud-provided resources that are or become known. Resources may include, but are not limited to, data storage, virtual machines, calculation engine, etc. Some examples below will refer to the resources as "files" but embodiments are not limited thereto.

Cloud backup service 140 communicates with cloud service 110 and with resource storage service 130 to backup stored resources in a manner which is consistent from the perspective of cloud service 110. Cloud backup service 140, cloud service 110 and resource storage service 130 are shown within respective cloud networks 145, 115 and 135. This depiction may indicate that each service resides on its own Internet Protocol (IP) network, but embodiments are not limited thereto. In this regard, any network, component or service described herein may consist of any number and types of networks, hardware components and software components which communicate with one another over any number and type of public (e.g., Web) or private (e.g., on-premise) networks.

As described above, backup service 140 begins the backup of a cloud resource stored by resource storage service 130 by executing a discovery process to identify one or more cloud services that are associated with (e.g., own or consume) the resource. Examples of such a discovery process will be described below. FIG. 1 depicts data 150 which may be identified during the discovery process. Data 150 specifies one or more services that are associated with the resource and, for each of such services, pre- and post-backup callbacks.

Cloud backup service 140 then transmits the identified pre-backup callback to service 110. In response, service 110 performs any actions required to place the resource in a consistent state and returns a status or other acknowledgement to cloud backup service 140. Backup service 140 then instructs resource storage service 130 to generate a backup of the resource. Next, backup service 140 transmits the identified post-backup callback to instruct cloud service 110 to perform any needed post-processing.

Cloud service 110 may comprise a file synchronization service in some embodiments. In response to a received pre-backup callback, such a file synchronization service may perform steps such as pausing and draining synchronization, and returning the call with a status. In response to receipt of a post-backup callback, a file synchronization service may perform steps such as resuming synchronization and returning the call with a status.

Restore from a previously-generated consistent backup may proceed similarly according to some embodiments. Initially, cloud backup service 140, using discovered data such as data 150, identifies the cloud services that are consuming the resource and pre- and post-restore callbacks for each of these services. Cloud backup service 140 then instructs resource storage service to restore the resource. The post-restore callback is then called into service 110 to indicate completion of the restore. As a result, the resource is restored in a consistent state which allows cloud service 110 to consume it.

In a case that service 110 is a file synchronization service, the pre-restore callback may result in pausing and draining synchronization and returning the call with a status. The post-restore call may cause service 110 to resume synchronization and return the call with a status.

Figure 2:
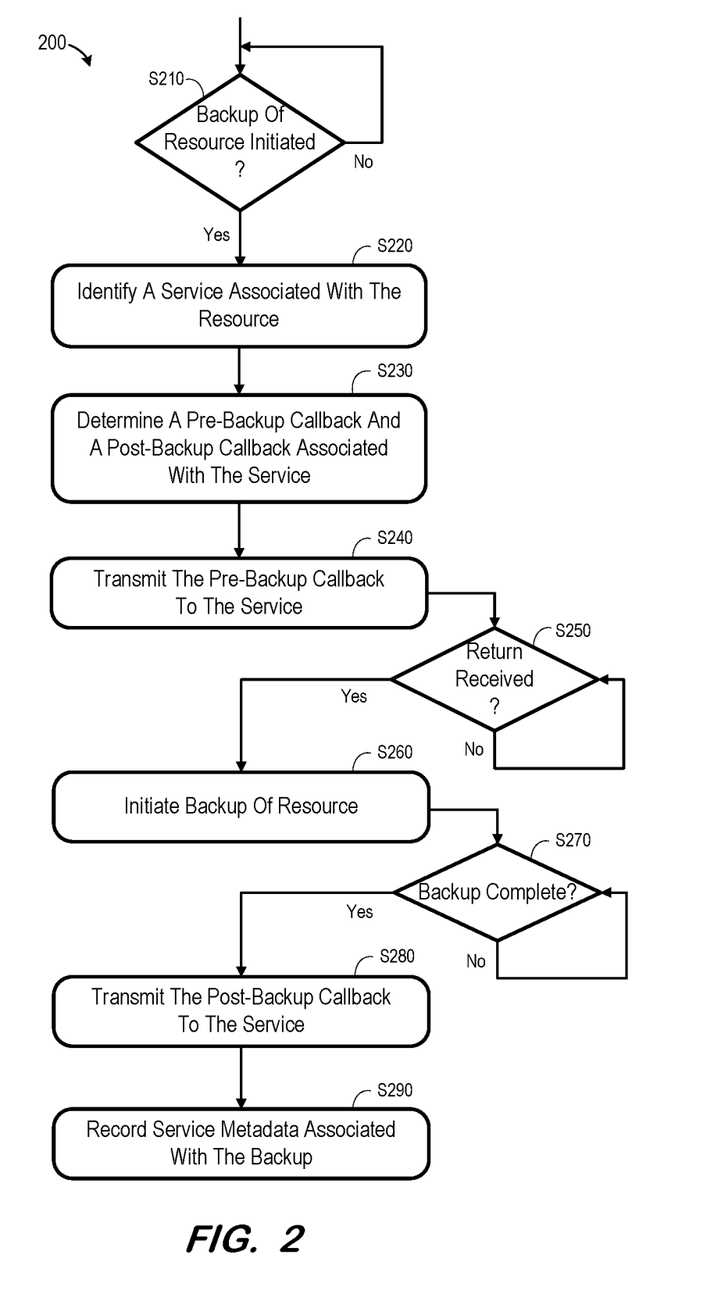
FIG. 2 is a flow diagram of a process to backup a resource associated with a cloud service according to some embodiments.

FIG. 2 comprises a flow diagram of process 200 to backup a cloud service-consumed resource according to some embodiments. In some embodiments, processing units (e.g., one or more processors, processing cores, processor threads) of a cloud backup service server execute software program code to cause the server to perform process 200. Execution of process 200 may be distributed among several server nodes. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
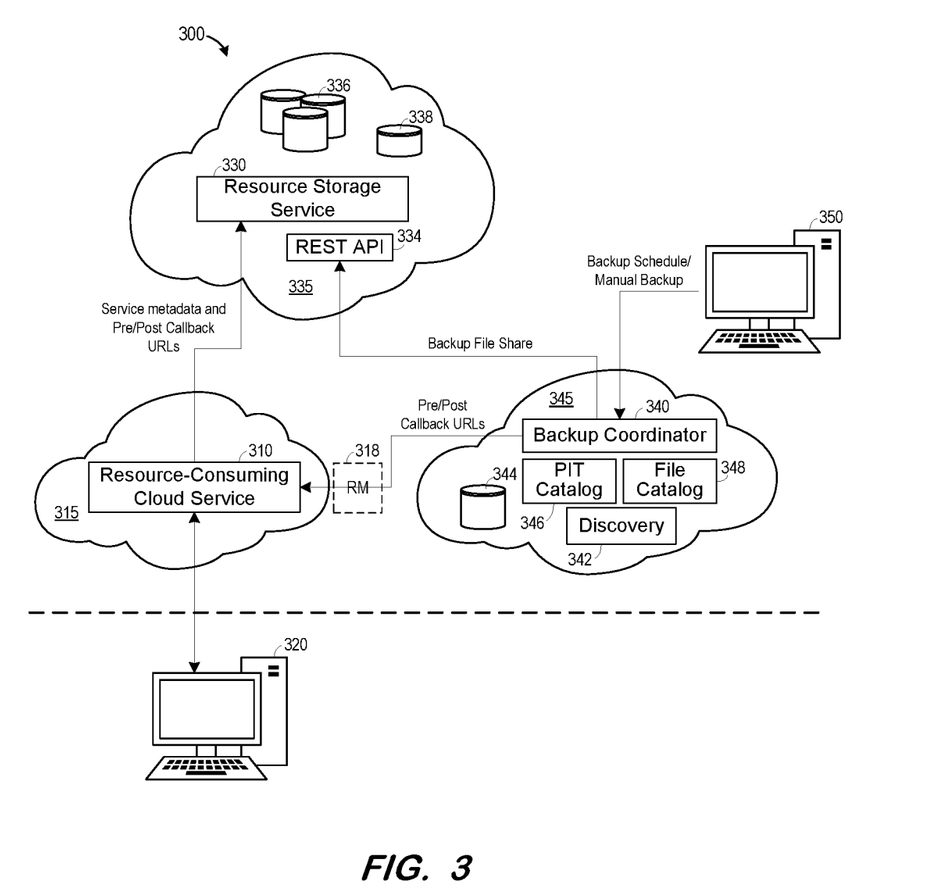
FIG. 3 illustrates an integrated cloud service backup architecture during a backup operation according to some embodiments.

FIG. 3 illustrates architecture 300 for executing process 200 according to some embodiments. Architecture 300 may comprise a specific implementation of architecture 100 in some embodiments. Embodiments of process 200 are not limited to architecture 100, 300 or any other architectures described herein.

Initially, flow cycles at S210 until backup of a resource is initiated. According to some embodiments, the backup may be initiated manually or according to a predetermined schedule. Manual initiation of a backup may be triggered by transmission of a command from administrator computing device 350 to backup coordinator 340 of a cloud backup service within cloud network 345. For example, an administrator may operate device 350 to browse file catalog 348 and identify a file, and to transmit a command to backup coordinator 340 to backup the identified file. An administrator may also or alternatively operate device 350 to establish one or more schedules for backing up one or more resources and to store the schedule in storage 344.

A backup is deemed initiated upon receipt of a command to perform a manual backup or arrival of a scheduled backup time. Flow then proceeds to S220 to identify a service associated with (i.e., consuming or owning) the resource to be backed up. At S230, pre- and post-backup callbacks associated with the service are determined. More than one service may be identified at S230, in which case pre- and post-backup callbacks associated with each identified service are determined at S230.

S220 and S230 may proceed according to any suitable system. In some embodiments, each cloud service registers its resources with backup coordinator 340 and specifies its pre- and post-backup callbacks. According to some embodiments, the pre- and post-backup callbacks are Uniform Resource Locators. Backup coordinator 340 may store the registered information in cache 344 and use the information to determine services associated with a resource and pre- and post-backup callbacks associated with each determined service.

According to some embodiments of S220 and S230, backup coordinator 340 calls into each running cloud service of architecture 300 (including unshown services) to inquire whether the service consumes the resource, and stores the response. Such inquiries may occur periodically to maintain up-to-date information.

Alternatively, resource storage service 330 provides an Application Programming Interface (API) that allows services to (a) register their metadata along with additional payloads such as callback URLs, (b) unregister and (c) enumerate the list of services and acquire the payload for each service. Accordingly, service 310 may use this API to register and unregister, and backup coordinator 340 can use this API for enumeration to obtain the list of services.

FIG. 3 illustrates yet another embodiment of S220 and S230. In particular, cloud service 310 persists its metadata and pre/post callbacks to metadata store 338. Discovery component 342 of the backup cloud service may read this metadata at S220 and S230 to determine the services which consume the resource and their corresponding pre/post callbacks.

Interaction between the backup service and the consuming service requires authentication and authorization. Specifically, a call from and into a cloud service must be properly authenticated and authorized. In some embodiments, the service-to-service call occurs over a secure protocol. For example, the backup service directly calls into the resource-consuming service using its Active Directory-authenticated service principal. The resource-consuming service authorizes the call based on a pre-established trust relationship with the service principal. Such an implementation requires all participating resource-consuming cloud services to establish a trust relationship with the service principal.

In other examples, each participating resource-consuming cloud service owns a plug-in which runs in a process space of the cloud backup service and exposes certain interfaces into which the cloud backup service AB may call. The plug-in then makes corresponding calls into the owning resource-consuming cloud service using a trusted certificate or service principal.

FIG. 3 illustrates an implementation of role-based authentication and authorization using a shared platform "management service" such as resource manager 318. According to some embodiments, all services including the resource-consuming service and the cloud backup service register into resource manager 318 to form the trust relationship between resource manager 318 and the cloud services. Resource manager 318 becomes the authentication and authorization proxy for the services, and supports role-based access with which the cloud backup service can create a role to gain access to service 310 and invoke APIs exposed by service 310 via resource manager 318.

The determined pre-backup callback is transmitted to the service at S240. In a case that more than one service was identified at S220, pre-backup callbacks associated with each identified service are transmitted to the respective services at S240. One or more services associated with a resource may not require pre- or post-backup processing, in which case no corresponding callback is specified or determined at S230.

According to some embodiments, the transmitted payload specifies the cloud service associated with the resource, a Resource ID, a property bag for additional metadata, and a backup job context such as a Backup Job ID. In some embodiments, the call is asynchronous to support long-running pre-backup processing.

One example of a pre-backup callback according to some embodiments is as follows:

POST: subscriptions/{GUID}/providers/ServiceProvider002/ProviderResourceEndpoint/ProviderResourceEndpointName/Pre-Backup&api-version={api-version}Req{ResourceID, BackupJobID}

The pre-backup callback URL may point to an endpoint of resource manager 318 according to some embodiments. Resource manager 318 may manage authentication and authorization to ensure that only authorized services can call into one another. In some embodiments, resource manager 318 obtains registration of all services which specifies what services and calls from those services are authenticated and authorized, and redirects received calls accordingly. In some embodiments, authentication and authorization may be performed by the communicating services themselves.

Flow then cycles at S250 while backup coordinator 340 waits for a return from service 310 (or resource manager 318). The return may consist of an ACK, a status, or other information. Backup coordinator 340 then instructs resource storage service 330 to generate a backup of the resource at S260 using REST API 334. According to some embodiments, service 330 will perform an actual backup of the resource to create a file snapshot. Service 330 may also move the snapshot to a hardened backup vault outside of cloud 335.

Flow cycles at S270 until the backup is complete and then proceeds to S280, at which point hardening of the backup may not yet be complete. At S280, backup coordinator 340 transmits the identified post-backup callback to service 310 (via resource manager 318 in some embodiments). One example of a post-backup callback according to some embodiments is as follows:

POST: subscriptions/{GUID}/providers/ServiceProvider002/ProviderResourceEndpoint/ProviderResourceEndpointName/Post-Backup&api-version={api-version}Req{ResourceID, BackupJobID}

According to some embodiments, the payload transmitted with the post-backup callback specifies the cloud service associated with the resource, the Resource ID, a property bag for additional metadata including Point-In-Time (PIT) information of the service related to the snapshot, and the Backup Job ID. In some embodiments, the post-backup call is asynchronous to support long-running post-backup processing.

After post-backup processing, service 330 returns the PIT information to backup coordinator 340. The PIT information is recorded in PIT catalog 346 of the cloud backup service at S290.

Figure 4:
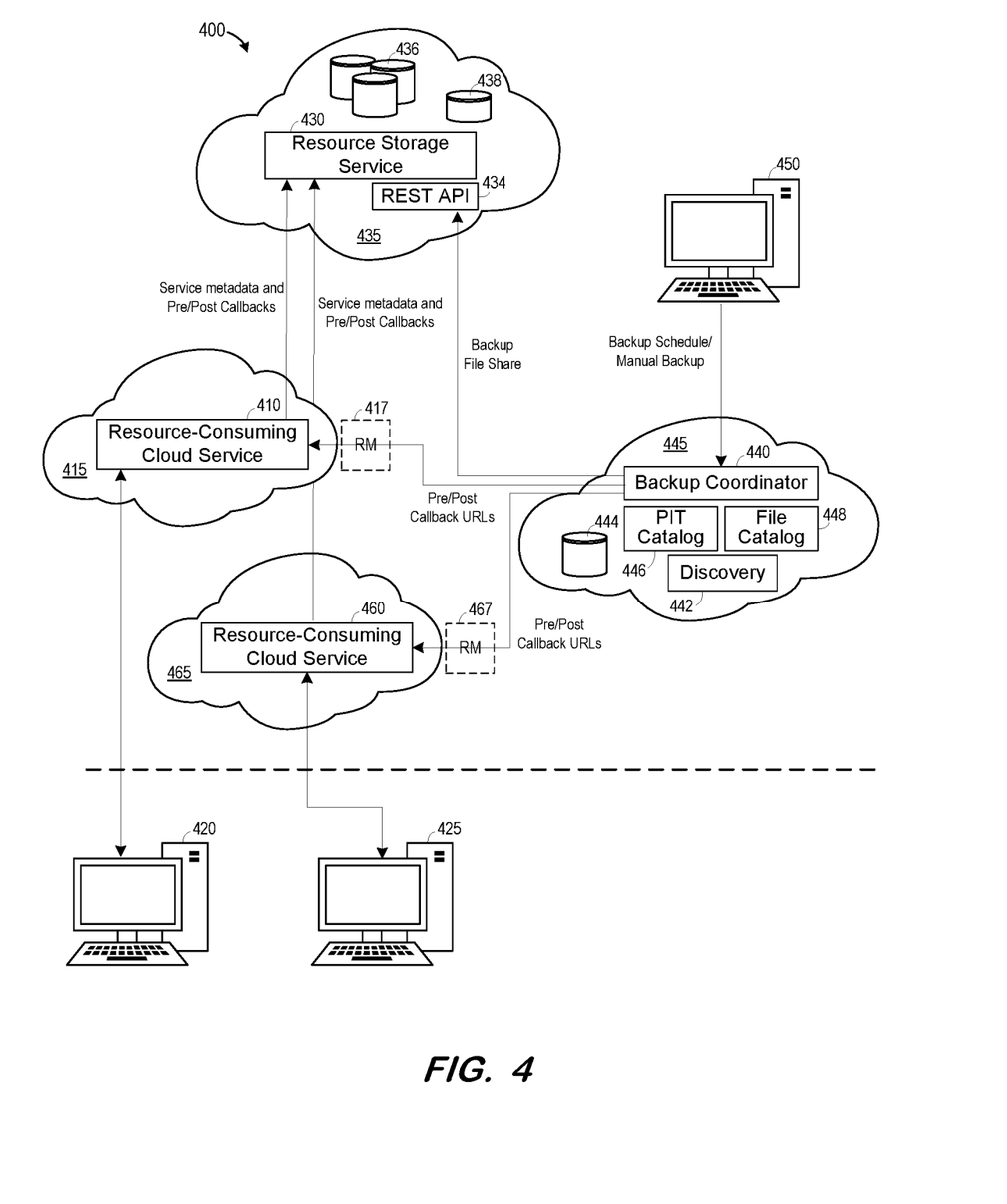
FIG. 4 illustrates an integrated cloud service backup architecture including two cloud services during a backup operation according to some embodiments.

FIG. 4 illustrates architecture 400 which may also implement process 200 according to some embodiments. In contrast to architecture 300, architecture 400 includes two resource-consuming cloud services 410 and 460. As described above, each of services 410 and 460 may consume a same resource. Each of services 410 and 460 may be associated with one or more resources with which the other service is not associated. These resources may be backed up via process 200 as described above.

Prior to backing up a shared resource, backup coordinator 440 may identify both of services 410 and 460, as well as specific pre- and post-backup callbacks respectively associated therewith, during a discovery process as described above. Backup coordinator 440 therefore transmits appropriate pre- and post-callbacks to each of services 410 and 460 before and after backup of the resource.

Figure 5:
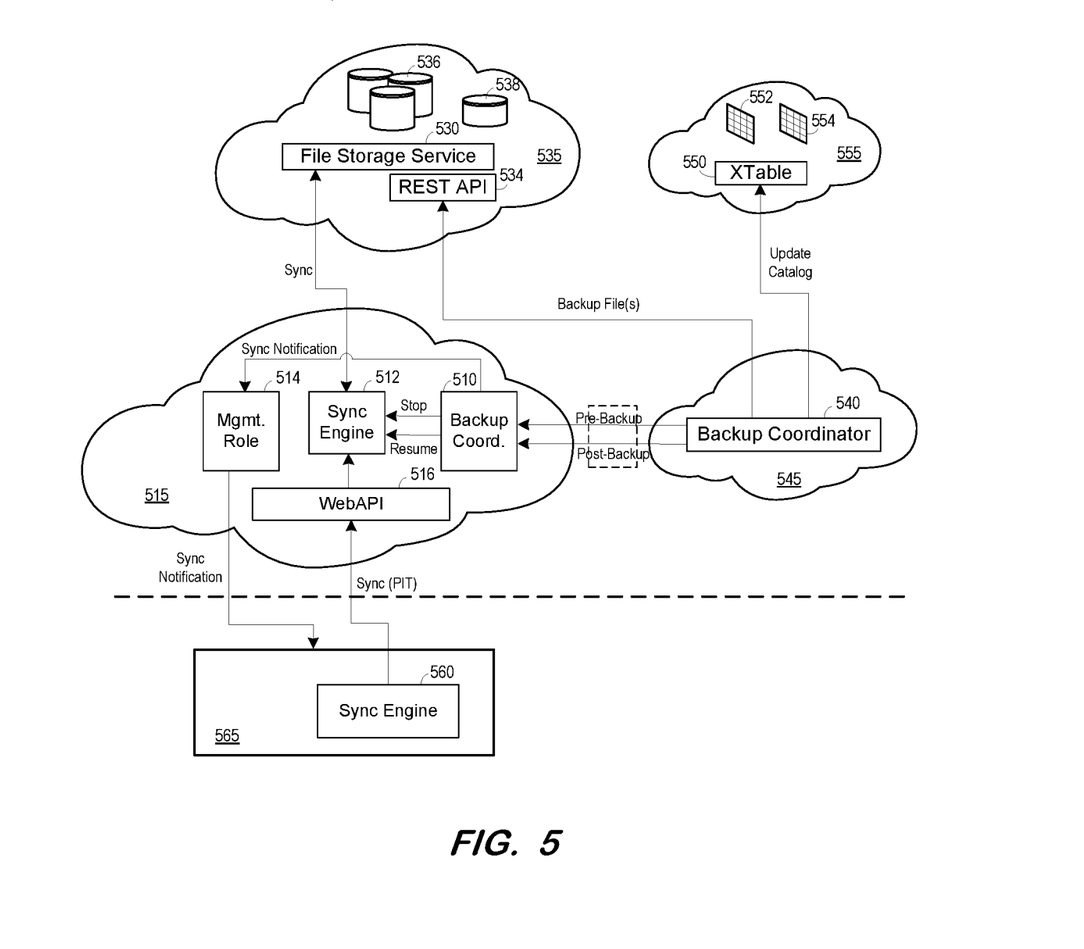
FIG. 5 illustrates an integrated cloud service backup architecture including a file sync cloud service during a backup operation according to some embodiments.

FIG. 5 illustrates architecture 500 according to some embodiments. According to architecture 500, cloud 515 provides a file synchronization service. For example, server 565 executes sync engine 560 which operates in conjunction with the file synchronization service to synchronize files with file storage service 530. According to some embodiments, server 565 includes file stubs which point to corresponding files stored in storage 536 of cloud 535 and maintained be file storage service 536.

The file synchronization service includes backup coordinator 510, sync engine 512 and management role component 514. In response to receipt of the pre-backup callback, backup coordinator 510 issues a stop command to sync engine 512, which pauses synchronization with file storage service 530. Backup coordinator 510 also issues a notification to component 514 which, in response, notifies server 565 to perform a PIT sync of open files. Upon receiving a return from the callback, backup coordinator 540 then initiates a backup process as described with respect to S260 and S270.

After conclusion of the backup process, and in response to receiving the post-backup callback, backup coordinator 510 issues a resume command to sync engine 512, which resumes synchronization with file storage service 530. The call is returned and, at S290, backup coordinator 540 may update PIT catalog 552 of cloud storage 555.

Figure 6:
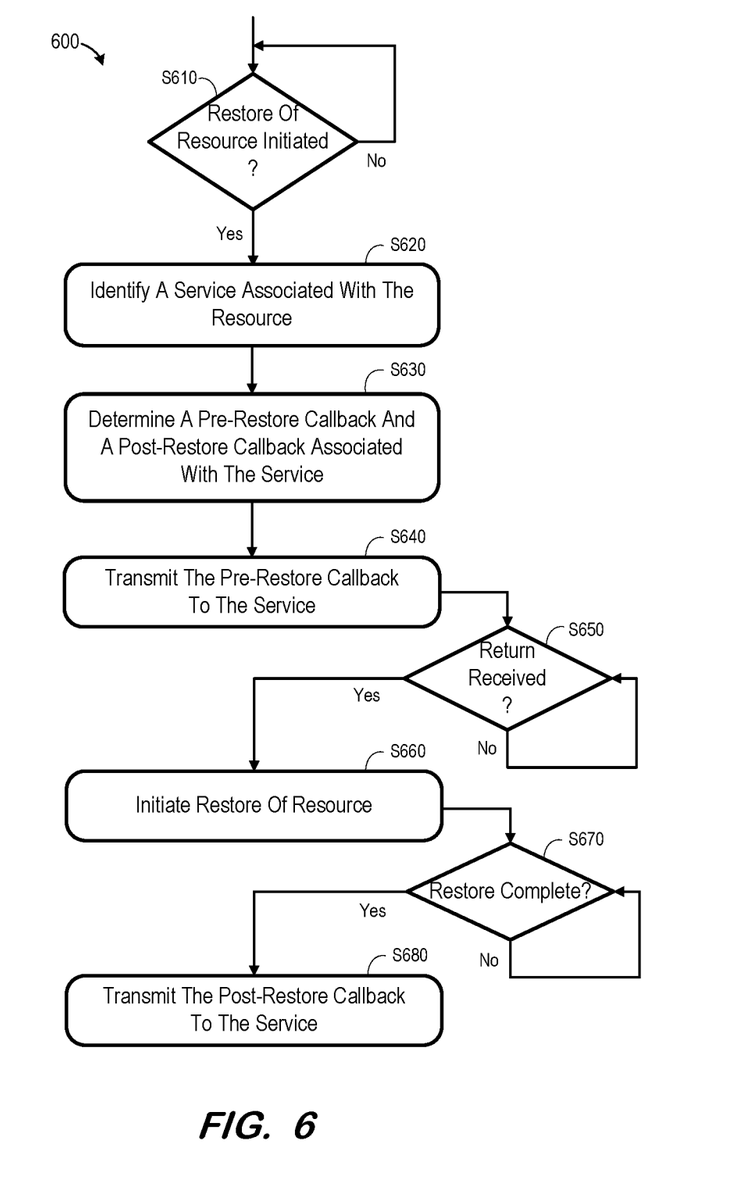
FIG. 6 is a flow diagram of a process to restore a resource associated with a cloud service according to some embodiments.
Figure 7:
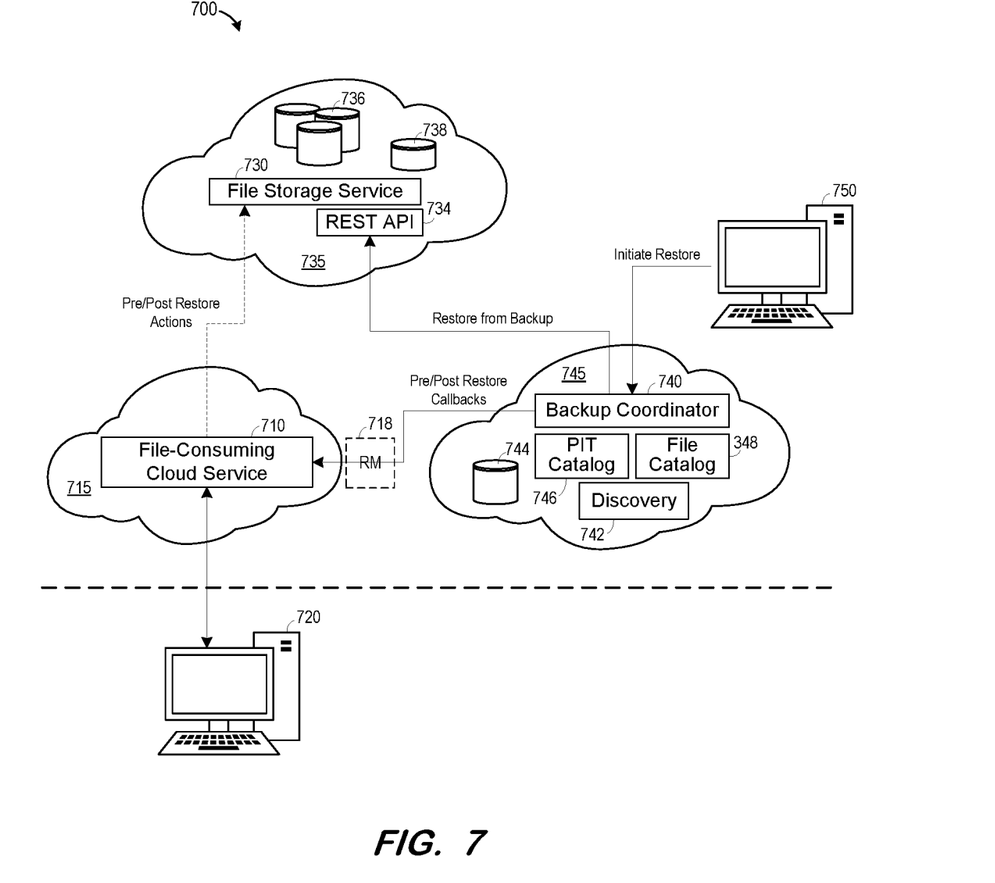
FIG. 7 illustrates an integrated cloud service backup architecture during a restore operation according to some embodiments.

FIG. 6 illustrates process 600 to restore a backed-up resource according to some embodiments. With reference to FIG. 7, administrator 750 may review PIT catalog 746 to identify previously-generated PIT backups of a resource. A restore may be initiated of a full share, or of individual files and folders.

Based on the previously-discovered service and callback information, a service associated with the resource is identified at S620 and pre- and post-restore callbacks are determined at S630. As described with respect to the backup operation, backup coordinator 740 transmits the pre-restore callback (via resource manager 718 in some embodiments) to service 710 at S640. If more than one service is identified at S620, corresponding callbacks are determined at S630 and transmitted to the respective identified services at S640. One or more identified services might not be associated with either or both of a pre-restore and post-restore callback.

According to some embodiments, the pre-restore callback request payload includes the cloud service entity that is consuming the resource, a Resource ID of the resource being restored, a property bag including additional metadata, a Restore Job ID of the restore job context in which the call is being made, and restore-specific properties such as an alternate location URL in case of alternate location restore and service metadata associated with the PIT of the restore. In a case that only selected portions of the resource are to be restored, the properties may include a file, directory or a list of files and directories.

According to some embodiments, the pre-restore callback conforms to the following format:

POST: subscriptions/{GUID}/providers/ServiceProvider002/ProviderResourceEndpoint/ProviderResourceEndpointName/Pre-Restore&api-version={api-version}Req{ResourceID, RestoreJobID, AlternateLocationURL, PartnerServicePITMetadata}

Flow cycles at S650 to await a return from the callback. The pre-restore callback may be asynchronous to support long running pre-restore processes.

At S660, backup coordinator 740 instructs the file storage service 730 to restore the resource from a stored backup. Restoration occurs during S670 and flow proceeds to S680 after restoration is complete. A restore operation may require a significant amount of time considering the number and size of the restored files. According to some embodiments, backup coordinator 740 sends a periodic heartbeat signal to service 710 to indicate that the restore is progressing. Such a signal may also be sent during backup to account for a long-running backup process, such as a backup process which includes hardening the backup by moving the data from the source resource (e.g., using a snapshot on the source resource) to an alternate storage location. Service 710 resumes normal operation if service 710 doesn't receive a heartbeat signal or post-restore callback within a specified timeout period.

The determined post-restore callback is transmitted to service 710 at S680. According to some embodiments, the post-restore callback request payload includes the cloud service entity that is consuming the resource, a Resource ID of the resource being restored, a property bag including additional metadata, a Restore Job ID of the restore job context in which the call is being made, and restore-specific properties such as a restore status and a restore file specification in case of item-level restore.

According to some embodiments, the post-restore callback conforms to the following format:

POST: subscriptions/{GUID}/providers/ServiceProvider002/ProviderResourceEndpoint/ProviderResourceEndpointName/Post-Restore&api-version={api-version}Req{ResourceID, RestoreJobID, RestoreStatus, RestoreFileSpec}

Flow cycles at S650 to await a return from the post-restore callback. The post-restore callback may be asynchronous to support long-running post-restore processes.

Figure 8:
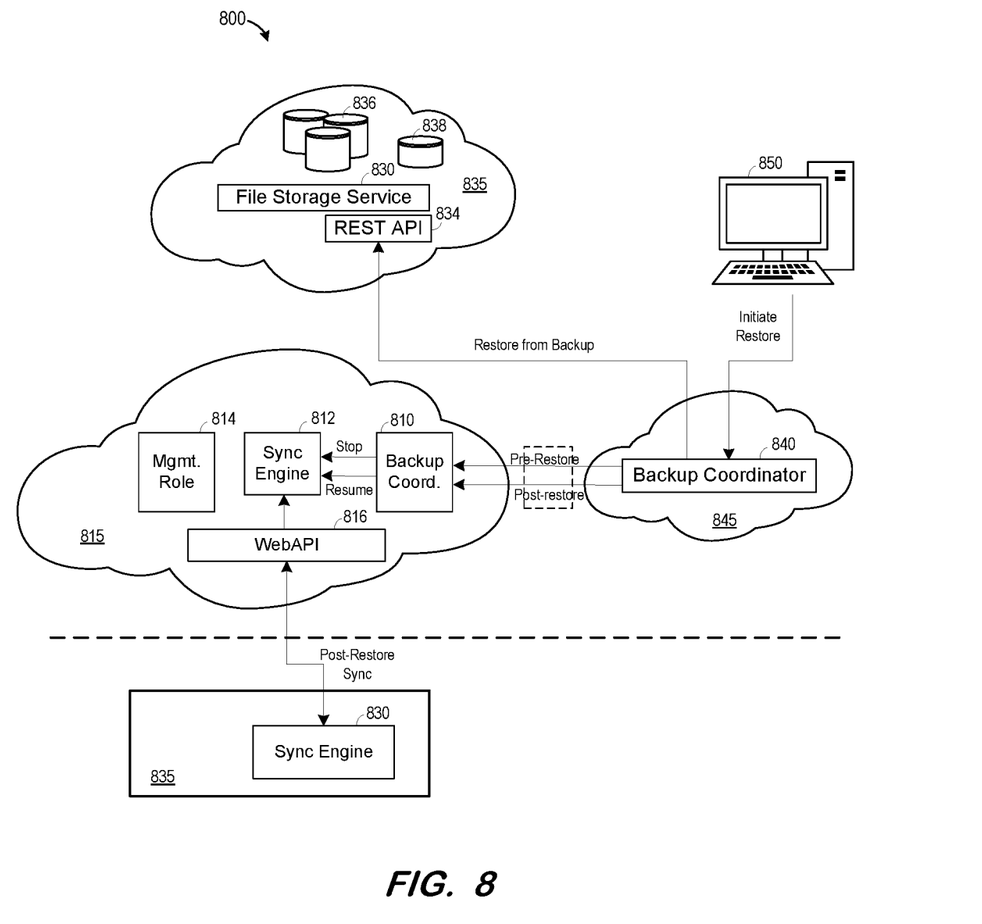
FIG. 8 illustrates an integrated cloud service backup architecture including a file sync cloud service during a restore operation according to some embodiments.

FIG. 8 illustrates architecture 800 during restoration of a resource from a backup according to some embodiments. Cloud 815 of architecture 800 may provide a file synchronization service as described above with respect to FIG. 5 above.

In response to receipt of a pre-restore callback, backup coordinator 810 may instruct sync engine 812 to stop synchronization to the resource. alone. This ensures consistency during restore. During restoration, files from a hardened backup store may be restored onto file storage 836. In some embodiments, a copy of the file is created on file storage 836 and the current version of the file remains on file storage 836. Alternatively, the current version may be overwritten, or the file may be restored on an alternate location. An extension to this would be for the resource being In response to a post-restore callback, backup coordinator 810 may instruct sync engine 812 to resume synchronization. In some embodiments, to ensure consistency during restore, the resource is locked to provide access only to the cloud service restoring the data. Additionally, a restore time stamp may be updated in a state of the file synchronization service, along with sync metadata for the files that were modified as part of restore. The restore time stamp may be used during conflict resolution to select the restored version if the conflict is associated with a time prior to the restore. Sync engine 830 may then execute a post-restore synchronization and then continue normal operation.

Figure 9:
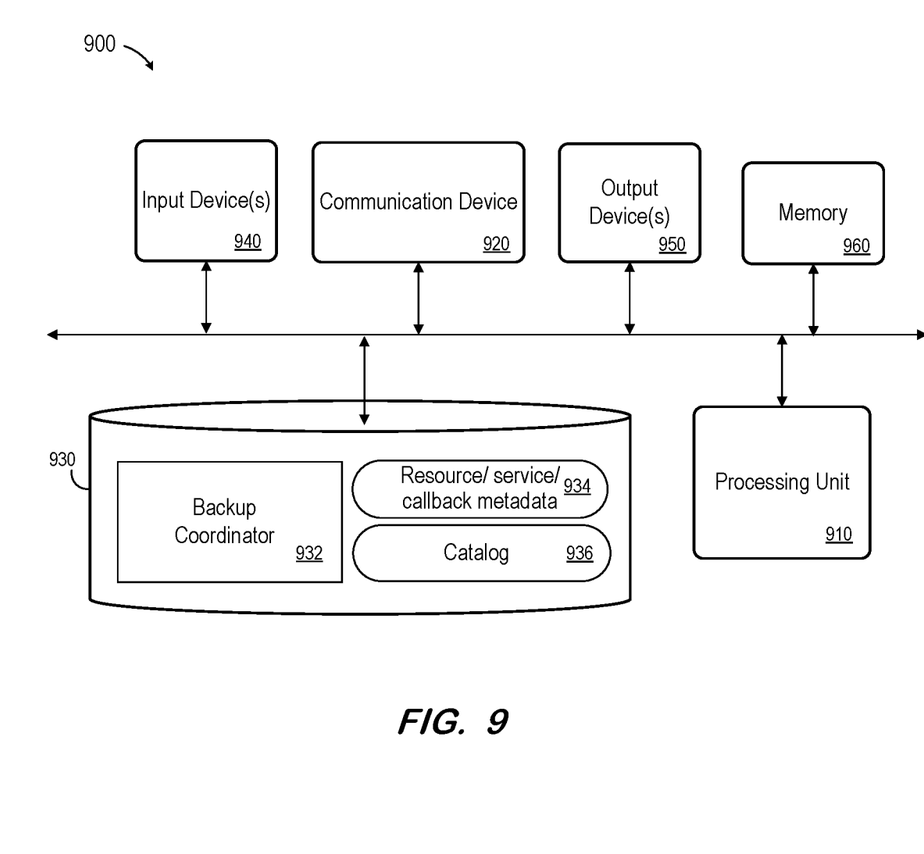
FIG. 9 illustrates a cloud backup server according to some embodiments.

FIG. 9 is a block diagram of system 900 according to some embodiments. System 900 may comprise a general-purpose computer server and may execute program code to provide a cloud backup service using any of the processes described herein. Any one or more components of system 900 may be implemented in a distributed architecture. System 900 may include other unshown elements according to some embodiments.

System 900 includes processing unit 910 operatively coupled to communication device 920, persistent data storage system 930, one or more input devices 940, one or more output devices 950 and volatile memory 960. Processing unit 910 may comprise one or more processors, processing cores, etc. for executing program code. Communication device 920 may facilitate communication with external devices, such as an external network of storage devices (i.e., machines) and of client devices requiring data storage services. Input device(s) 940 may comprise, for example, a keyboard, a keypad, a mouse or other pointing device, a microphone, a touch screen, and/or an eye-tracking device. Output device(s) 950 may comprise, for example, a display (e.g., a display screen), a speaker, and/or a printer.

Data storage system 930 may comprise any number of appropriate persistent storage devices, including combinations of magnetic storage devices (e.g., magnetic tape, hard disk drives and flash memory), optical storage devices, Read Only Memory (ROM) devices, etc. Memory 960 may comprise Random Access Memory (RAM), Storage Class Memory (SCM) or any other fast-access memory.

Backup coordinator 932 may comprise program code executed by processing unit 910 to cause system 900 to perform any one or more of the processes described herein. For example, program code of backup coordinator 932 may be executed to discover metadata 934 associating resources with consuming services, and pre- and post-backup and restore callbacks for each resource/consuming service pair. Program code of backup coordinator 932 may further be executed to store catalog 936 of PIT backups for use in restoring selected resources or files. Data storage device 930 may also store data and other program code for providing additional functionality and/or which are necessary for operation of system 900, such as device drivers, operating system files, etc.

Each functional component described herein may be implemented in computer hardware (integrated and/or discrete circuit components), in program code and/or in one or more computing systems executing such program code as is known in the art. Such a computing system may include one or more processing units which execute processor-executable program code stored in a memory system.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A computer-readable medium storing processor-executable process steps, the processor-executable process steps being storable in a memory of a computing device and executable by one or more processors of the computing device to cause the computing device to:
   determine a resource stored in a cloud storage service;
   identify a first cloud service associated with the resource;
   determine a first pre-backup callback and a first post-backup callback associated with the first cloud service;
   transmit the first pre-backup callback to the first cloud service;
   receive a return of the first pre-backup callback from the first cloud service;
   in response to receipt of the return, transmit an instruction to the cloud storage service to backup the resource; and
   transmit the first post-backup callback to the first cloud service.

2. A computer-readable medium according to claim 1, the processor-executable process steps being executable by the one or more processors to cause the computing device to:
   identify a second cloud service associated with the resource;
   determine a second pre-backup callback and a second post-backup callback associated with the second cloud service;
   transmit the second pre-backup callback to the second cloud service before transmission of the instruction to the cloud storage service to backup the resource; and
   receive a return of the second pre-backup callback from the first cloud service; and
   transmit the second post-backup callback to the second cloud service after determination that backup of the resource is complete,
   wherein the instruction to the cloud storage service to backup the resource is transmitted in response to receipt of the return of the second pre-backup callback and receipt of the return of the first pre-backup callback.

3. A computer-readable medium according to claim 2, the processor-executable process steps being executable by the one or more processors to cause the computing device to:
   determine a second resource stored in the cloud storage service;
   identify a third cloud service associated with the second resource;
   determine a third pre-backup callback and a third post-backup callback associated with the third cloud service;
   transmit the third pre-backup callback to the third cloud service;
   receive a return of the third pre-backup callback from the third cloud service;
   in response to receipt of the return of the third pre-backup callback, transmit an instruction to the cloud storage service to backup the second resource; and
   transmit the third post-backup callback to the third cloud service.

4. A computer-readable medium according to claim 1, the processor-executable process steps being executable by the one or more processors to cause the computing device to:
   determine a second resource stored in the cloud storage service;
   identify a second cloud service associated with the second resource;
   determine a second pre-backup callback and a second post-backup callback associated with the second cloud service;
   transmit the second pre-backup callback to the second cloud service;
   receive a return of the second pre-backup callback from the second cloud service;
   in response to receipt of the return of the second pre-backup callback, transmit an instruction to the cloud storage service to backup the second resource; and
   transmit the second post-backup callback to the second cloud service.

5. A computer-readable medium according to claim 1, wherein identification of the first cloud service associated with the resource and determination of the first pre-backup callback and the first post-backup callback comprises:
   acquisition of metadata stored with the resource in the cloud storage service.

6. A computer-readable medium according to claim 5, wherein the first pre-backup callback comprises a Uniform Resource Locator associated with the first cloud service and identifying the resource.

7. A computer-readable medium according to claim 1, the processor-executable process steps being executable by the one or more processors to cause the computing device to:
   determine one or more pre-restore callbacks and one or more post-restore callbacks associated with the first cloud service;
   transmit the one or more pre-restore callbacks to the first cloud service;
   receive a return of each of the one or more pre-restore callbacks from the first cloud service;
   in response to receipt of the return of each of the one or more pre-restore callbacks, transmit an instruction to the cloud storage service to restore the resource; and
   transmit the one or more post-restore callbacks to the first cloud service.

8. A computer-readable medium according to claim 7, the processor-executable process steps being executable by the one or more processors to cause the computing device to:
   transmit one or more heartbeat signals to the first cloud service after transmission of the instruction to the cloud storage service to restore the resource and before transmission of the one or more post-restore callbacks to the first cloud service.

9. A method comprising:
   determining a resource stored in a cloud storage service;
   identifying a first cloud service associated with the resource;
   determining a first pre-backup callback and a first post-backup callback associated with the first cloud service;
   transmitting the first pre-backup callback to the first cloud service;
   receiving a return of the first pre-backup callback from the first cloud service;
   in response to receipt of the return, transmitting an instruction to the cloud storage service to backup the resource; and
   transmitting the first post-backup callback to the first cloud service.

10. A method according to claim 9, further comprising:
    identifying a second cloud service associated with the resource;
    determining a second pre-backup callback and a second post-backup callback associated with the second cloud service;
    transmitting the second pre-backup callback to the second cloud service before transmission of the instruction to the cloud storage service to backup the resource; and receiving a return of the second pre-backup callback from the first cloud service; and transmitting the second post-backup callback to the second cloud service after determination that backup of the resource is complete, wherein the instruction to the cloud storage service to backup the resource is transmitted in response to receipt of the return of the second pre-backup callback and receipt of the return of the first pre-backup callback.

11. A method according to claim 10, further comprising:

determining a second resource stored in the cloud storage service;

identifying a third cloud service associated with the second resource;

determining a third pre-backup callback and a third post-backup callback associated with the third cloud service;

transmitting the third pre-backup callback to the third cloud service;

receiving a return of the third pre-backup callback from the third cloud service;

in response to receipt of the return of the third pre-backup callback, transmitting an instruction to the cloud storage service to backup the second resource; and transmitting the third post-backup callback to the third cloud service.

12. A method according to claim 9, further comprising:

determining a second resource stored in the cloud storage service;

identifying a second cloud service associated with the second resource;

determining a second pre-backup callback and a second post-backup callback associated with the second cloud service;

transmitting the second pre-backup callback to the second cloud service;

receiving a return of the second pre-backup callback from the second cloud service;

in response to receipt of the return of the second pre-backup callback, transmitting an instruction to the cloud storage service to backup the second resource; and transmitting the second post-backup callback to the second cloud service.

13. A method according to claim 9, wherein identifying the first cloud service associated with the resource and determining the first pre-backup callback and the first post-backup callback comprises:

acquiring metadata stored with the resource in the cloud storage service.

14. A method according to claim 13, wherein the first pre-backup callback comprises a Uniform Resource Locator associated with the first cloud service and identifying the resource.

15. A method according to claim 9, further comprising:

determining one or more pre-restore callbacks and one or more post-restore callbacks associated with the first cloud service;

transmitting the one or more pre-restore callbacks to the first cloud service;

receiving a return of each of the one or more pre-restore callbacks from the first cloud service;

in response to receipt of the return of each of the one or more pre-restore callbacks, transmitting an instruction to the cloud storage service to restore the resource; and transmitting the one or more post-restore callbacks to the first cloud service.

16. A method according to claim 15, further comprising:

transmitting one or more heartbeat signals to the first cloud service after transmission of the instruction to the cloud storage service to restore the resource and before transmission of the first post-restore callback to the first cloud service.

17. A system to provide a cloud backup service, the system to:

determine a file stored in a cloud storage service;

identify a file synchronization cloud service associated with the file;

determine a first pre-backup callback to pause synchronization and a first post-backup callback to resume synchronization, the first pre-backup callback and the first post-backup callback associated with the file synchronization cloud service;

transmit the first pre-backup callback to the file synchronization cloud service;

receive a return of the first pre-backup callback from the file synchronization cloud service;

in response to receipt of the return, transmit an instruction to the cloud storage service to backup the file; and transmit the first post-backup callback to the file synchronization cloud service.

18. A system according to claim 17, wherein identification of the file synchronization cloud service associated with the file and determination of the first pre-backup callback and the first post-backup callback comprises:

acquisition of metadata stored with the file in the cloud storage service by the file synchronization cloud service.

19. A system according to claim 18, wherein the first pre-backup callback comprises a Uniform Resource Locator associated with the file synchronization cloud service.

20. A system according to claim 17, the system further to:

determine one or more pre-restore callbacks to pause synchronization and one or more post-restore callbacks to resume synchronization, the one or more pre-restore callbacks and the one or more post-restore callbacks associated with the file synchronization cloud service;

transmit the one or more pre-restore callbacks to the file synchronization cloud service;

receive a return of each of the one or more pre-restore callbacks from the file synchronization cloud service;

in response to receipt of the return of the one or more pre-restore callbacks, transmit an instruction to the cloud storage service to restore the file; and transmit the one or more post-restore callbacks to the file synchronization cloud service.

* * * * *